May 1, 1951　　　　O. W. OERMAN　　　　2,551,457
CUSHION HITCH DEVICE
Filed Dec. 18, 1948　　　　2 Sheets-Sheet 1
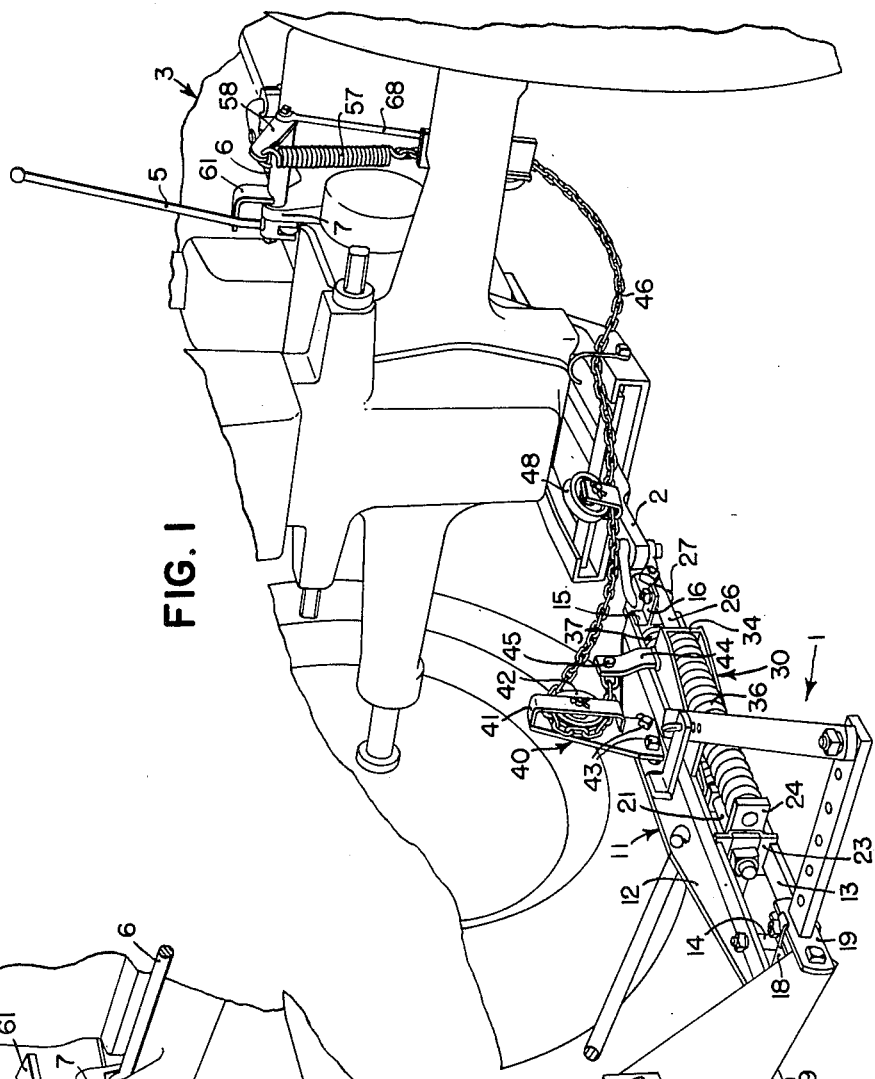
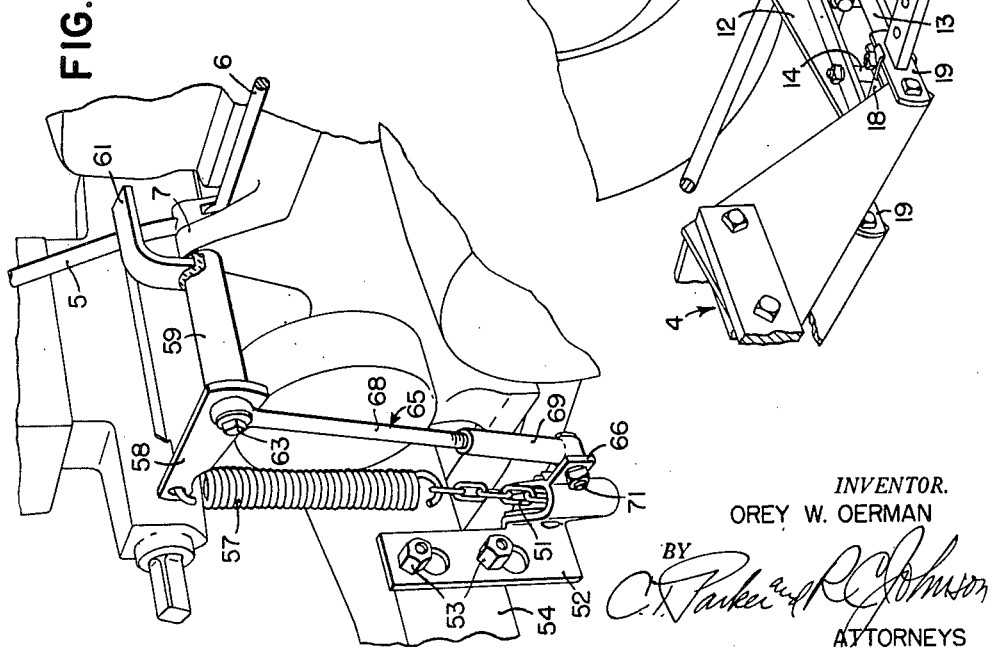
INVENTOR.
OREY W. OERMAN
BY
ATTORNEYS May 1, 1951      O. W. OERMAN      2,551,457

CUSHION HITCH DEVICE

Filed Dec. 18, 1948      2 Sheets-Sheet 2

INVENTOR.
OREY W. OERMAN

ATTORNEYS

Patented May 1, 1951

2,551,457

UNITED STATES PATENT OFFICE 2,551,457

CUSHION HITCH DEVICE

Orey W. Oerman, Moline, Ill., assignor to Deere & Company, Moline, Ill., a corporation of Illinois Application December 18, 1948, Serial No. 66,077

12 Claims. (Cl. 180—14.5)

The present invention relates generally to agricultural machines and more particularly to hitch devices by which agricultural implements are connected to a tractor or other means for propelling them.

The object and general nature of the present invention is the provision of a new and improved hitch device adapted to be connected between an implement, such as a plow or the like, and a farm tractor to be utilized as a source of power for propelling the implement both in its working and its transport positions. More specifically, it is a feature of this invention to provide a cushion hitch device so constructed and arranged as to provide an extra long cushioning unit but without requiring excessive length in the draft transmitting structure. Further, it is a feature of this invention to provide for the transmission of draft forces through a pair of springs arranged serially with a single spring whereby, during normal operation, the latter spring provides a cushioning action, but is constructed and arranged so that the extent of compression or imposition of forces on the single spring element is limited by means of abutting parts, abutment of said parts then causing the entire draft pull to be transmitted through the pair of generally parallel springs.

In this connection, it is a further feature of this invention to provide new and improved means for disengaging the tractor clutch when the cushion hitch device referred to above is extended under abnormal loading, such as that in which there might be some tendency for the tractor to stall, tip up at the front end, or the like. More particularly, it is a feature of this invention to provide a clutch releasing mechanism which includes motion-multiplying means whereby the slack, usually necessary in hitches of this type to accommodate turning and the like, is taken up during the first stage of yielding of the cushion hitch device and, moreover, the clutch disengaged during such first stage. In a cushion hitch device as referred to above, the first stage of yielding takes place when the intermediate member interposed between the two load-resisting spring means, moves up against associated stops or the like. Motion of the clutch releasing mechanism at the end of this stage of yielding is such as to release the tractor clutch. However, the cushion hitch device is capable of further yielding in order to bring the tractor to a standstill but without requiring the disconnection of the hitch, and it is a further feature of the present invention in this connection to provide a yielding element in the clutch operating connections so as to accommodate this second stage of yielding of the hitch device under overload. The provision of motion-multiplying means operative during the first stage of yielding more than adequately secures the necessary amount of movement required for taking up the slack in the clutch actuating element and disengaging the tractor clutch. A further feature of this invention is the provision of clutch releasing connections so constructed and arranged that the action of the motion-multiplying means terminates at the end of the first stage of yielding of the cushion hitch device, so that the second stage of yielding of the hitch device does not cause excessive movement of the clutch operating connections but produces only a reduced amount of movement of the clutch operating connections. By reducing the amount of movement of the clutch operating connections during the second stage of yielding of the cushion hitch device, the clutch-protecting yielding element of such connections need not be excessive in length and may be a simple spring.

These and other objects and advantages of the present invention will be apparent to those skilled in the art after a consideration of the following detailed description, taken in conjunction with the accompanying drawings, in which one form of the invention has been shown by way of illustration.

In the drawings:

Figure 1 is a perspective view of the front portion of a plow and a rear portion of its propelling tractor, with my improved cushion hitch and clutch-disengaging connections, the latter being shown in their normal operating positions in which the tractor clutch is engaged whereby the tractor propels the plow and the clutch-disengaging connections are sufficiently slack to accommodate the necessary turning and other relative movement between the plow and tractor as encountered in normal operation.

Figure 2 is a fragmentary perspective showing the connection of the clutch operating means with the conventional clutch lever of the tractor.

Figure 3:
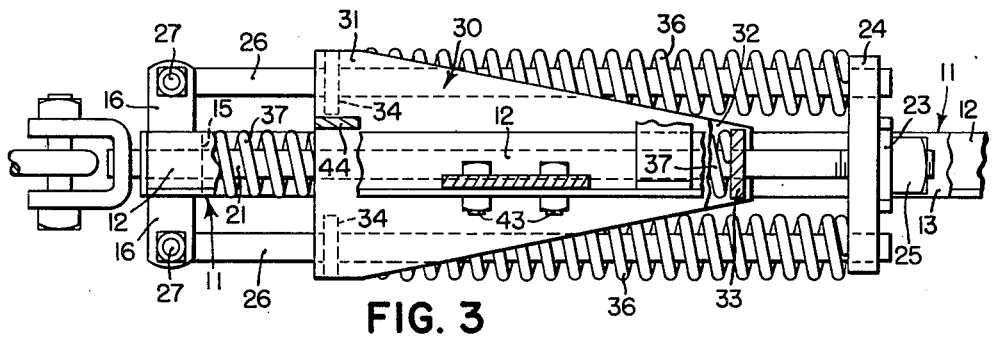
Figure 3 is an enlarged plan view showing the details of certain features of the spring cushion hitch device per se.

Referring now to the drawings, particularly Figure 1, the spring cushion hitch device of the present invention is indicated in its entirety by the reference numeral 1 and is shown as connected between the drawbar 2 of a conventional farm tractor 3 and an agricultural implement 4, which is shown as a plow but which may be any other implement. The hitch unit 1 is of the spring-cushion type, that is, a type in which the transmission of pulling forces from the tractor to the implement is cushioned through the use of springs or the like, whereby both the tractor and the implement are protected from excessive loads due to abrupt changes in the draft forces transmitted, as may sometimes occur, for example, when the implement strikes a stone, root or the like. The hitch 1 also is of the type which affords a certain amount of cushioning during normal operation, but according to the principles of the present invention the tractor clutch is maintained in engaged position at all times until the amount of yielding, as under excess overloads, reaches a certain amount. The tractor 3 is provided with a main clutch of conventional construction, controlled by a hand operated clutch lever 5 which operates the tractor clutch through a link 6 (Figure 2). The tractor clutch mechanism is such that the hand lever 5 remains in either of its positions, that is engaged or disengaged, unless positively moved out of that position. Normally, the clutch lever 5 is moved forwardly to engage the clutch, as shown in Figure 1, and rearwardly to disengage the clutch, which is the position shown in Figure 2. The tractor 3 is conventionally equipped with a pivot member supporting the clutch lever 5 for rocking movement on a lug 7 carried by the body of the tractor.

The spring cushion hitch unit 1 includes a main draft member 11 which preferably is made up of an upper angle member 12 and a lower strap member 13 connected together at their rear ends by a spacer 14 and at their forward ends by a block member 15 which is formed with apertured lateral extensions 16. The main draft member 11 is connected through suitable means, which includes a transverse bar 18 and clevises 19, to the front end of the plow 4. The block member is apertured to receive a forward draft-transmitting member 21 which preferably is in the form of a fore and aft extending rod carrying at its rear end a slide block 23 and a cross bar 24, the latter extending at each side laterally outwardly beyond the slide or guide member 23. A heavy nut 25 on the rear end of the rod 21 transmits the forward pull from the rod 21 through the slide 23 to the cross bar 24. The ends of the cross bar 24 are apertured to receive a pair of side rods 26 which at their forward ends are connected by bolts 27 to the lateral extensions 16 on the front block member 15.

As best shown in Figure 3, an intermediate member 30 is mounted for sliding movement on both the rod member 21 and the side rods 26. The intermediate member 30 includes upper and lower plates 31 and 32, connected together by a rear plate 33 which is apertured to receive the center rod member 21 and a pair of front plates 34 which are apertured to receive respectively the side rods 26. A pair of springs, each of which is indicated by the reference numeral 36, is disposed between the front plates 34 and the rear cross bar 24, the springs being disposed about the side rods 26. A third spring 37 is disposed about the center rod member 21 and lies between the rear plate 33 and the front block member 15.

In normal operation, the forward draft of the tractor is transmitted to the front end of the rod member 21 and from the rear end of the latter member through the cross bar 24 and two springs 36 to the intermediate member 30. From the latter the draft force is transmitted through the rear block 33 to the rear end of the center spring 37, and from the front end of the latter to the front end of the main draft member 11 which is connected at its rear end to the plow 4. Preferably, the springs 36 and 37 are of substantially the same strength and all yield during the transmission of draft forces. However, since the two springs 36 are disposed in parallelism they yield only approximately half the amount that the front spring 37 yields. When the single spring 37 approaches the limit of its permissive deflection, the front end of the intermediate member 30 comes up against the block member 15, thus terminating further yielding of the spring 37. However, continued yielding of the hitch device can take place by further compression in the springs 36. However, all normal operating loads are taken care of by yielding of all of the springs 36 and 37 and the intermediate member 30 does not normally come into contact with the block member 15 until the draft forces become excessive. During the normal cushioning movement of the hitch unit 1, the main draft member 11 slides rearwardly along the center rod member 21 away from the block member 15, and since the spring 37 is compressed approximately twice the amount of compression in the springs 36, because the latter two act against the one spring 37, during the time the main draft member 11 slides a given amount rearwardly along the rod member 21, the intermediate member 30 slides rearwardly along the rod member 21 and the rods 26 a distance substantially equal only to two-thirds of the amount of rearward movement of the member 11 along the rod member 21.

The clutch throwout mechanism, which is indicated in its entirety by the reference numeral 40, is especially constructed to respond to the relative movement between the intermediate member 30 and the main draft member 11 and to disengage the tractor clutch for shifting the hand lever 5 rearwardly, substantially at or before the intermediate member engages the block member 15. The clutch throwout mechanism will now be described. Fixed to the angle member 12 is a pulley bracket 41 carrying suitable means upon which a sheave or pulley 42 is mounted for rotation. A bracket 41 is fixed to the angle 12, as by bolts 43, and is positioned rearwardly of the front portion of the intermediate member 30. This portion of the latter member carries a bracket or lug 44, preferably welded to the upper plate 31, and the lug 44 carries a pin or bolt 45 to which the rear end of a flexible clutch-disengaging member, preferably in the form of a chain 46, is connected. The rear portion of the chain 46 is extended rearwardly and is trained over the pulley 42, then extends forwardly through a guide pulley 48 and thence forwardly over a guide pulley 51 which is carried by a bracket 52 fixed by studs 53 to the forward side of the right hand axle quill 54 of the tractor. Beyond the pulley 51, the chain 46 extends upwardly and connects to the lower end of a spring 57, the upper end of which is connected to an arm 58 which is fixed to the outer end of a sleeve 59, the inner end of which carries a clutch lever operating extension 61. The sleeve 59 is mounted on a pivot member 63 which is longer than and replaces the usual pivot that is carried by the tractor lug 7 and rockably receives the hand clutch lever 5. The pivot member 63 is considerably longer than the conventional pivot member and its outer end is supported by an adjustable brace member 65 which at its lower end is connected to an apertured lug 66 fixed to the front portion of the front pulley support bracket 52. Preferably, the brace 65 consists of an upper rod 68 the lower end of which is threaded into a vertically disposed adjustable sleeve 69 that is connected by a bolt 71 to the bracket extension 66.

The operation of my new and improved cushion hitch and clutch-controlling connection is substantially as follows.

Figure 4:
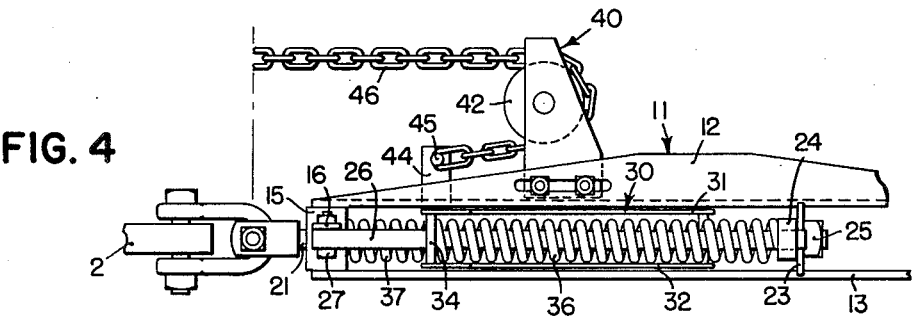
Figures 4, 5 and 6 show the different positions of the cushion hitch device and the associated clutch operating connections.
Figure 5:
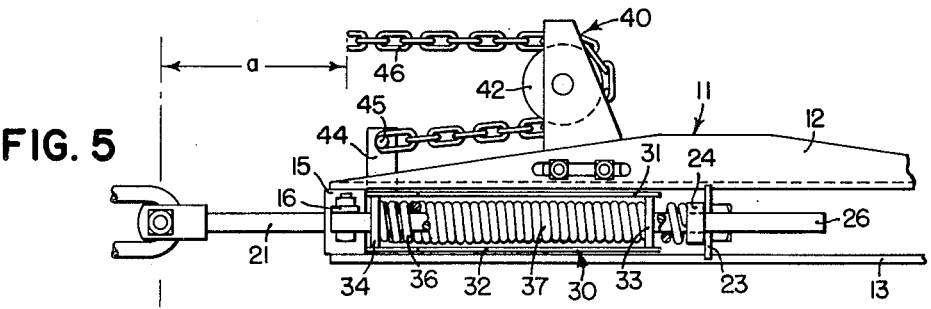
Figure 6:
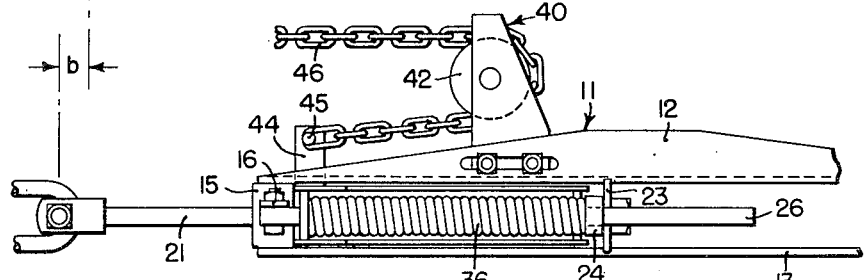

The normal operating position of the several parts is shown in Figure 1, in which the clutch-controlling chain 46 includes slack sufficient to accommodate turning movement of the tractor relative to the implement and any other normal variations in the position of the implement and tractor one with respect to the other. Upon the occurrence of an overload of such magnitude that it becomes desirable to disconnect the power, the spring members 36 and 37 yield, which results in a rearward movement of the draft member 11 along the draft rod 21 and additionally a rearward movement of the draft member 11 and bracket 40, carrying the pulley 42, relative to the intermediate member 30 and the lug 44 carried by the latter. As best shown in Figures 4 and 5, this movement of the bracket 40 relative to the bracket 44 is multiplied by the chain and sheave arrangement so that the front portion of the chain 46 is moved rearwardly relative to the tractor a distance indicated at $a$ in Figure 5, which is equal to twice the amount of movement of the member 11 relative to the intermediate member 30, plus the amount of rearward movement of the lug 44 relative to the rod 21. The parts are so arranged that this movement is sufficient to take up the slack in the chain 46 and act through the spring 57 and arm 58 to rock the hand lever 5 from its forward position to its rearward position, thus disengaging the tractor clutch. As mentioned above, however, the clutch is disengaged substantially at or before the intermediate member 30 engages the block 15, which terminates any further compression in the spring 37, and therefore terminates any further relative movement between the intermediate member 30 and the main draft member 11. However, further extension of the hitch unit 1, as indicated by the distance $b$ in Figure 6, is possible by virtue of further compression of the pair of springs 36, which thus yield under additional excess overloading. As the springs 36 yield the main draft member 11 moves rearwardly an additional amount along the rod member 21, but this motion is not multiplied by the chain and sheave arrangement since the intermediate member 30 now no longer moves relative to the draft member 11. Therefore, under the excess overloading as accommodated by the springs 36, the chain 46 moves rearwardly relative to the tractor only the same amount of movement, as indicated at $b$, as the hitch and plow. While this movement is at a rate less than the rate of movement when the draft member 11 moves relative to the intermediate member 30, it is or may be an amount of movement that must be accommodated without damaging the tractor clutch and associated parts, and to this end the chain 46 is connected to the clutch disengaging lever 58 through the spring 57. Thus, the spring 57 yields to permit the movement of the chain 46 just mentioned.

The clutch operating connections just described are particularly adapted for use with a cushion hitch of the two-stage type, and the parts are so arranged that during yielding in the first stage, the yielding motion is multiplied, and this multiplied motion is made use of to disengage the tractor clutch. However, movement of the operating connections during the second stage of yielding, as under excessive overloads, is accommodated by the resilient element in the clutch operating connections and is not multiplied.

While I have shown and described above the preferred structure in which the principles of the present invention have been incorporated, it is to be understood that my invention is not to be limited to the exact details shown and described above, but that, in fact, widely different means may be employed in the practice of the broader aspects of my invention.

What I claim, therefore, and desire to secure by Letters Patent is:

1. For use in an agricultural outfit including a propelling tractor having a releasable clutch and a towed implement connected to the tractor through a cushion hitch which includes two relatively shiftable members, the improvement which comprises two serially interconnected spring means adapted to be mounted on said hitch for yieldably resisting relative movement between said members, a part disposed between said two spring means and movable under load relative to one of said members when draft is applied to the other of said members, and means cooperating with said part for limiting movement thereof after one of said spring means has been deflected a predetermined amount, a clutch release device comprising a member adapted to be connected to disconnect said clutch, and motion-multiplying means connected with said part and adapted to be connected with said one of said relatively shiftable members for moving said clutch actuating member in a direction to release said clutch before said part engages said limit means and at a rate and extent of movement greater than the rate and extent of relative movement of said part and said one relatively shiftable member.

2. For use in an agricultural outfit including a propelling tractor having a releasable clutch and a towed implement connected to the tractor through a cushion hitch which includes two relatively shiftable members; the improvement that comprises two serially interconnected spring means adapted to yieldably resist relative movement between said members, one of said members being capable of transmitting a greater force per unit deflection than the other and draft force of the tractor applied to one of said members being first transmitted to said stronger spring means, thence to the other spring means and from the latter to the other of said members, a part disposed between said two spring means and movable under loads relative to said other of said relatively shiftable members, a sheave carried by said other member rearwardly of said part, a connection adapted to be established between said clutch and said part including a flexible section extending rearwardly to and around said sheave and thence forwardly to said part, whereby a given amount of rearward movement of said other member relative to said one member causes substantially twice that amount of rearward movement of said clutch operating connection, stop means limiting the relative movement of said part relative to said other member whereby further relative movement between said members is accommodated by deflection of said stronger spring means with no further movement of said part relative to said other member, and spring means in said clutch operating connection so as to accommodate a further extent of rearward movement of said other member and said part as a unit relative to said one member and the resultant rearward movement of said conection of the same extent without over-operation of said clutch.

3. For use in an agricultural outfit including a propelling tractor having a releasable clutch and a towed implement connected to the tractor through a cushion hitch which includes a main draft member connectible at its rear end to said implement, a draft part shiftable along said draft member and connectible at its forward end to said tractor, a cross member fixed to the rear end of said draft part, an intermediate member also shiftable relative to said main draft member, a pair of springs acting between said cross member and said intermediate member, and a single spring acting between said intermediate member and the front end of said main draft member, the improvement which includes a clutch release device comprising a pulley bracket adapted to be fixed to said main draft member rearwardly of said intermediate member, a pulley carried thereby, a second bracket adapted to be fixed to said intermediate member and movable away from said pulley bracket when yielding of said springs under load permits said intermediate member to move relative to said main draft member, a flexible clutch actuating connection secured at one end to said second bracket and adapted to extend rearwardly therefrom around said pulley and thence forwardly to the tractor clutch, whereby rearward movement of said main draft member along said draft part causes a rearward movement of said clutch actuating connection which is substantially twice the amount of rearward movement of said main draft member relative to said intermediate member, said clutch actuating connection being adapted to be connected with the tractor clutch whereby said rearward movement of said clutch actuating connection disengages said clutch.

4. In an agricultural outfit including a propelling tractor having a releasable clutch and a towed implement connected to the tractor through a cushion hitch which includes a main draft member connectible at its rear end to said implement, a draft part shiftable along said draft member and connectible at its forward end to said tractor, a cross member fixed to the rear end of said draft part, an intermediate member also shiftable relative to said main draft member, a pair of springs acting between said cross member and said intermediate member, and a single spring acting between said intermediate member and the front end of said main draft member, the combination therewith of a clutch release device comprising a pulley bracket fixed to said main draft member rearwardly of said intermediate member, a pulley carried thereby, a second bracket fixed to said intermediate member and movable away from said pulley bracket when yielding of said springs under load permits said intermediate member to move relative to said main draft member, a flexible clutch actuating connection secured at one end to said second bracket and extending rearwardly therefrom around said pulley and thence forwardly to the tractor clutch, whereby rearward movement of said main draft member along said draft part causes a rearward movement of said clutch actuating connection which is substantially twice the amount of rearward movement of said main draft member relative to said intermediate member, said clutch actuating connection being connected with the tractor clutch whereby said rearward movement of said clutch actuating connection disengages said clutch.

5. For use in an agricultural outfit including a propelling tractor having a releasable clutch and a towed implement connected to the tractor through a cushion hitch which includes a main draft member connectible at its rear end to said implement, the improvement which comprises a draft part adapted to be mounted for shifting movement along said draft member and connectible at its forward end to said tractor, a cross member fixed to the rear end of said draft part, an intermediate member also adapted to be mounted for shifting movement relative to said main draft member, a pair of springs acting between said cross member and said intermediate member, and means to limit the amount of forward movement of said intermediate member relative to said main draft member, whereby during further rearward movement of said main draft member relative to said draft member, as under an overload, the draft is transmitted entirely by said pair of springs, a single spring acting between said intermediate member and the front end of said main draft member and dimensioned so as to yieldably hold said intermediate member rearwardly of said motion-limiting means, a clutch release device comprising a pulley bracket adapted to be fixed to said main draft member rearwardly of said intermediate member, a pulley carried thereby, a second bracket adapted to be fixed to said intermediate member and movable away from said pulley bracket when yielding of said springs under load permits said intermediate member to move relative to said main draft member, a flexible clutch actuating connection secured at one end to said second bracket and extending rearwardly therefrom around said pulley and thence forwardly to the tractor clutch, whereby rearward movement of said main draft member along said draft part causes a rearward movement of said clutch actuating connection which is substantially twice the amount of rearward movement of said main draft member relative to said intermediate member, said clutch actuating connection being adapted to be connected with the tractor clutch whereby said rearward movement of said clutch actuating connection disengages said clutch, and spring means in said clutch actuating connection to accommodate further rearward movement of said connection and said main draft and intermediate members together relative to the tractor as the transmission of said overload forces causes further deflection of said pair of springs only.

6. For use in an agricultural outfit including a propelling tractor having a releasable clutch and a towed implement connected to the tractor through a cushion hitch which includes two relatively shiftable parts, the improvement which comprises a two-stage yielding means for resisting relative movement of said parts, a clutch release device comprising a member adapted to be connected to disconnect said clutch, motion-multiplying means adapted to be connected with said relatively shiftable parts and said member for moving the latter, at approximately twice the extent of yielding of said yielding means during the first stage of yielding thereof, to disengage said clutch, and spring means connected with said member and adapted to be connected with said clutch to accommodate further relative movement between said parts during the second stage of yielding of said yielding means.

7. For use in an agricultural outfit including a propelling tractor having a releasable clutch and a towed implement connected to the tractor through a cushion hitch which includes a pair of relatively movable parts, the improvement which comprises means for resisting relative movement therebetween in one direction including a pair of springs and a third spring arranged serially with respect to said pair of springs, and means for limiting the amount of stress imparted to said third spring, a clutch release device comprising a member adapted to be connected to disconnect said clutch, and means responsive to the yielding of only said third spring for shifting said member.

8. For use in an agricultural outfit including a propelling tractor having a releasable clutch and a towed implement connected to the tractor through a cushion hitch which includes a pair of relatively movable parts, the improvement which comprises means for resisting relative movement therebetween in one direction including a pair of springs and a third spring arranged serially with respect to said pair of springs, and means for limiting the amount of stress imparted to said third spring, a clutch release device comprising a member adapted to be connected to disconnect said clutch, and motion-multiplying means connected to be responsive to the yielding of only said third spring for shifting said member.

9. For use in an agricultural outfit including a propelling tractor having a releasable clutch and a towed implement connected to the tractor through a cushion hitch which includes a pair of relatively movable parts, one adapted to receive the tractive pull and the other adapted to transmit the pull to an implement or the like, the improvement which comprises an intermediate member adapted to be disposed between said parts and shiftable relative to both, a pair of springs disposed generally in parallelism between said intermediate member and one of said parts, and a single spring acting between said intermediate member and the other of said parts, a clutch release device comprising a member adapted to be connected to disconnect said clutch, and motion-multiplying means connected with said intermediate member and responsive to yielding of said single spring for shifting said clutch operating member.

10. A hitch device adapted to connect an implement with a tractor having a releasable clutch, said hitch device comprising a main draft member, an intermediate member, and a draft part, all relatively shiftable with respect to one another, relatively strong spring means interposed between said part and said intermediate member, relatively weak spring means interposed between said intermediate member and said main draft member, means for connecting the latter to the implement, means for connecting said draft part to the tractor, and means responsive at least in part to rearward movement of said main draft member along said part relative to said intermediate member for releasing said clutch.

11. A hitch device adapted to connect an implement with a tractor having a releasable clutch, said hitch device comprising a main draft member, an intermediate member, and a draft part, all relatively shiftable with respect to one another, relatively strong spring means interposed between said part and said intermediate member, relatively weak spring means interposed between said intermediate member and said main draft member, means for connecting the latter to the implement, means for connecting said draft part to the tractor, and means responsive to rearward movement of said main draft member along said part relative to said intermediate member for releasing said clutch, said responsive means including a yielding part to protect said clutch upon further movement of said main draft member along said draft part upon yielding of said relatively stronger spring means.

12. A hitch device adapted to connect an implement with a tractor having a releasable clutch, said hitch device comprising a main draft member, an intermediate member, and a draft part, all relatively shiftable with respect to one another, relatively strong spring means interposed between said part and said intermediate member, relatively weak spring means interposed between said intermediate member and said main draft member, means for connecting the latter to the implement, means for connecting said draft part to the tractor, means responsive to rearward movement of said main draft member along said part relative to said intermediate member for releasing said clutch, a pulley bracket in said main draft member, a pulley thereon, a flexible element connected at one end to said intermediate member and trained over said pulley and extending to the tractor, a pulley bracket on the tractor, a pulley on the latter bracket and receiving said element, a clutch operating member on the tractor including an arm receiving said element, a pivot receiving said clutch operating member, and a brace extending from the outer end of said pivot to said last mentioned pulley bracket.

OREY W. OERMAN.

REFERENCES CITED

The following references are of record in the file of this patent:

UNITED STATES PATENTS

| Number | Name | Date |
|---|---|---|
| 1,305,651 | Kaiser | June 3, 1919 |